United States Patent
Cernko et al.

(10) Patent No.: US 9,725,173 B2
(45) Date of Patent: Aug. 8, 2017

(54) DETACHABLE CONNECTING ARRANGEMENT FOR FITTING LAUNCHABLE EXTERNAL LOADS TO AN AIRCRAFT

(75) Inventors: Emil Cernko, Reichertshausen (DE); Ronald Deslandes, Unterhaching (DE); Wolfgang Schwarz, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 908 days.

(21) Appl. No.: 13/811,109

(22) PCT Filed: Jul. 15, 2011
(Under 37 CFR 1.47)

(86) PCT No.: PCT/DE2011/001444
§ 371 (c)(1),
(2), (4) Date: Aug. 6, 2013

(87) PCT Pub. No.: WO2012/028130
PCT Pub. Date: Mar. 8, 2012

(65) Prior Publication Data
US 2014/0008495 A1 Jan. 9, 2014

(30) Foreign Application Priority Data
Jul. 21, 2010 (DE) .................. 10 2010 031 750

(51) Int. Cl.
*F16G 11/10* (2006.01)
*B64D 1/08* (2006.01)
(Continued)

(52) U.S. Cl.
CPC ................ *B64D 1/08* (2013.01); *B64D 1/02* (2013.01); *B64D 7/08* (2013.01); *F16B 21/02* (2013.01)

(58) Field of Classification Search
CPC ... B64D 1/02; B64D 1/04; B64D 1/06; B64D 1/08; B64D 1/12; B64D 1/22; B64D 7/08;
(Continued)

(56) References Cited

U.S. PATENT DOCUMENTS

| | | | | |
|---|---|---|---|---|
| 721,427 A | * | 2/1903 | Cope ..................... | E21B 17/046 |
| | | | | 403/353 |
| 1,807,782 A | * | 6/1931 | Fuchs ....................... | F16B 7/22 |
| | | | | 15/104.31 |

(Continued)

FOREIGN PATENT DOCUMENTS

| DE | 37 03 792 C1 | 7/1988 |
|---|---|---|
| GB | 2 094 875 A | 9/1982 |

OTHER PUBLICATIONS

Corresponding International Search Report with English Translation dated Aug. 13, 2012 (five (5) pages).
(Continued)

*Primary Examiner* — Alyson M Merlino
(74) *Attorney, Agent, or Firm* — Crowell & Moring LLP

(57) ABSTRACT

A detachable connecting arrangement for fitting launchable external loads to an aircraft, having a hook-like connecting element fitted to the external load and a holding element fitted to the aircraft for the hook-like connecting element. The hook-like connecting element includes a lower supporting surface and an upper supporting surface. The holding element has a first opposing supporting surface that interacts with the lower supporting surface, and a second, upper opposing supporting surface that interacts with the upper supporting surface. The lower supporting surface and the first opposing supporting surface are designed to support mass forces of the external load directed away from the aircraft, and the upper supporting surface and the upper (Continued)

opposing supporting surface are designed to support mass forces of the external load directed towards the aircraft.

12 Claims, 2 Drawing Sheets

(51) Int. Cl.
*B64D 1/02* (2006.01)
*B64D 7/08* (2006.01)
*F16B 21/02* (2006.01)

(58) Field of Classification Search
CPC ...... E05B 63/12; E05B 63/126; E05B 63/127; E05C 5/00; E05C 2005/005; E05C 19/10; E05C 19/12; F16B 21/02
USPC .... 410/77, 80; 292/56, 63–69, 95, 109–136, 292/96–103, 106, 108, 300, 302, 304, 292/340, 341.15–341.17; 403/82, 163, 403/348, 353
See application file for complete search history.

(56) References Cited

U.S. PATENT DOCUMENTS

| | | | |
|---|---|---|---|
| 3,942,749 A | | 3/1976 | Hasquenoph et al. |
| 3,954,233 A | * | 5/1976 | Hasquenoph ............ B64D 7/08 244/137.4 |
| 5,172,873 A | | 12/1992 | Lum |
| 5,588,771 A | * | 12/1996 | Scott ....................... E21B 17/04 403/102 |
| 5,932,829 A | | 8/1999 | Jakubowski, Jr. |
| 6,145,898 A | * | 11/2000 | Onderka ................. D06F 37/42 292/198 |
| 7,325,844 B2 | * | 2/2008 | Salice .................... E05C 19/022 292/124 |

OTHER PUBLICATIONS

German-language Written Opinion dated Aug. 13, 2012 (PCT/ISA/237) (six (6) pages).

* cited by examiner

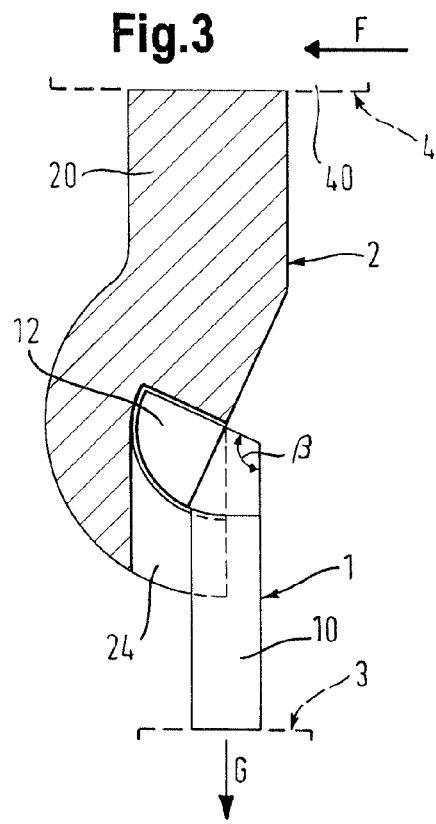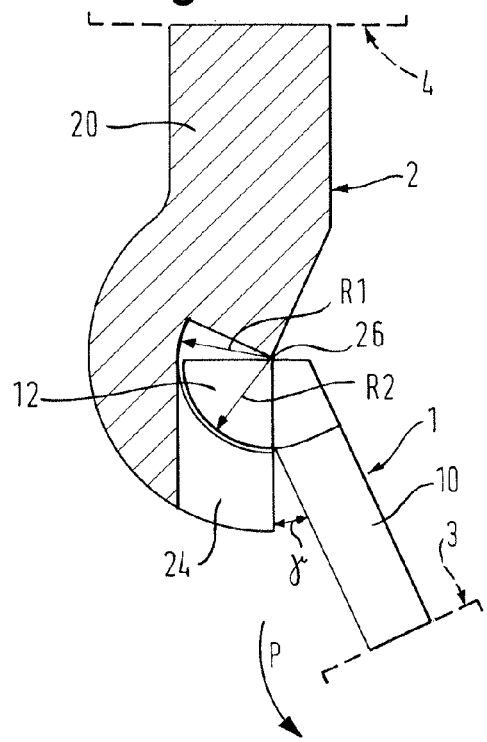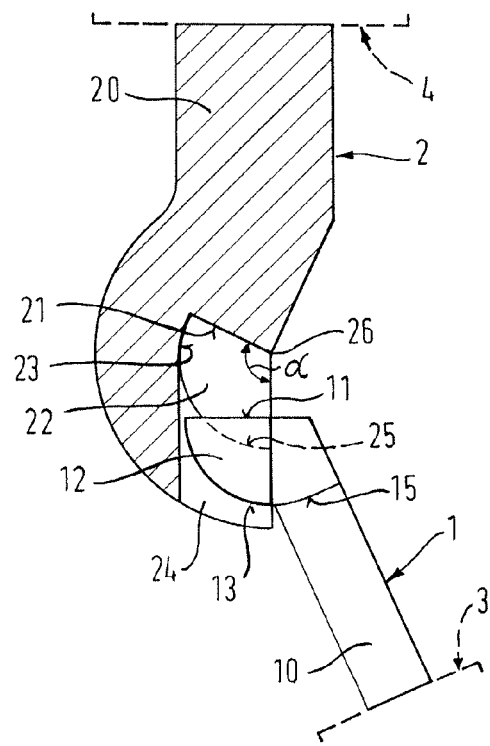

DETACHABLE CONNECTING ARRANGEMENT FOR FITTING LAUNCHABLE EXTERNAL LOADS TO AN AIRCRAFT

TECHNICAL FIELD

The present invention relates to a detachable connecting arrangement for fitting launchable external loads to an aircraft.

BACKGROUND OF THE INVENTION

Aircraft, especially combat aircraft, frequently have detachable external loads, for instance weapons or additional fuel tanks. These external loads are generally attached at two points on the aircraft, for instance under the fuselage or bearing surface. Hooks and eyes are used to attach the external loads, it being possible to open the hooks and/or the eyes for launching the external loads. In addition, ejection devices are provided that thrust the external load away from the aircraft when an external load is launched.

When external loads are launched from an aircraft, it must be ensured that no part of the aircraft is struck and damaged by the external load that is launched. To this end the ejection devices are normally adjusted such that the external load is thrust away from the aircraft and simultaneously caused to rotate so that the nose of the external load moves downward ("pitches down"). This pitch-down movement by the nose causes the oncoming air to act on the top of the external load, pressing it further downward, that is, away from the aircraft. As a rule this ensures that there is no risk of the external load colliding with the aircraft.

However, there are situations, especially with large and light-weight external loads, such as for instance empty tanks, in which this known measure does not necessarily lead to the desired success. Due to their relatively low weight, large and light-weight external loads are subject to considerable lifting forces that, despite the induced downward pitch of the nose and the flow of air acting on the top of the external load, may cause the tail of the external load to move upward towards the aircraft due to the lifting forces. This may cause critical situations, especially if the external load is suspended beneath the aircraft fuselage. In aircraft that are provided with a low-set elevator there is the danger that the upward lifting tail of the external load will strike the elevator even when external loads are suspended beneath bearing surfaces.

Today launching external loads, especially empty tanks, therefore requires that certain flight maneuvers be executed that reduce the risk of the launched load colliding with parts of the aircraft.

SUMMARY OF THE INVENTION

Exemplary embodiments of the present invention are directed to a detachable connecting arrangement for fitting launchable external loads to an aircraft, which connecting arrangement has a design and function that increases safety when the external load is launched.

The inventive connecting arrangement includes at least one hook-like connecting element that can be fitted to the external load and includes at least one holding element that can be fitted to the aircraft for the hook-like connecting element. The inventive detachable connecting element is distinguished in that the hook-like connecting element is provided with at least one lower supporting surface and at least one upper supporting surface; in that the holding element is provided with at least one first opposing supporting surface that is designed to interact with the at least one first supporting surface, and with at least one second, upper opposing supporting surface that is designed to interact with the at least one upper supporting surface, wherein the lower supporting surface and the first opposing supporting surface are designed to support mass forces of the external load directed away from the aircraft, and wherein the upper supporting surface and the upper opposing supporting surface are designed to support mass forces of the external load directed towards the aircraft.

This detachable connecting arrangement is attached in the tail area of the external load. The front of the external load on the aircraft may be suspended in the conventional manner using known detachable connecting devices. For detaching the inventive detachable connecting arrangement attached to the tail, the lower supporting surface and the first opposing supporting surface are disengaged by the aerodynamic forces acting on the external load so that then the hook-like connecting element can escape downward out of the holding element, the connecting elements disengaging. While the lower supporting surface and the associated opposing supporting surface are disengaged, the upper supporting surface of the hook-like connecting element remains in contact with the upper opposing supporting surface of the holding element so that the external load is prevented from moving upward, that is, towards the aircraft, and at the same time it is ensured that the connecting element is not permitted to slip out of the holding element immediately after the mechanical element holding the external load to the aircraft opens.

In this manner the simple inventively embodied mechanical design of the connecting arrangement prevents the external load from colliding with the aircraft due to lift.

In one advantageous embodiment of the inventive connecting arrangement, the hook-like connecting element has a fastening shaft that can be connected to the external load and at its upper end is provided with a projecting nose, the lower supporting surface being embodied on the bottom of the nose. Furthermore, the holding element has a recess that is embodied for engaging the nose, the first opposing supporting surface being provided in the area of the wall of the recess.

In this design, the projecting nose, which in a carrying flight engages in the recess of the holding element, can in a mechanically reliable manner support on the holding element connected to the aircraft the forces proceeding from the mass of the external load. In this embodiment, to detach the connecting arrangement it is merely necessary for the nose to be moved out of the recess. If the hook-like connecting element is attached to the external load such that the nose faces forward in the direction of flight and if the holding element is attached to the aircraft such that the opening of the recess faces to the rear, when the angle of separation is attained the separation of connecting element and holding element may be effected almost exclusively by the flow forces of the flowing air that act on the external load. Prior to attaining the angle of separation, the forces exclusively oriented forward in the direction of flight due to the rotation prevent the head of the hook-like connecting element, which head is provided with the nose, from slipping rearward, these forces being supported against the housing of the holding element by the projecting nose.

It is particularly advantageous when the holding element has a second groove-like recess for receiving the fastening shaft of the connecting element. Because of this, the fastening shaft can be received in the locked condition in the groove-like recess and when the connecting arrangement is detached the nose projecting forward from the fastening shaft can slide downward through the second groove-like recess immediately after leaving the first recess.

The upper supporting surface is preferably provided on an upper section of the hook-like connecting element and the upper opposing supporting surface is embodied at least on one edge on the upper margin of the recess for the holding element. Because of this a linear contact between the hook-like connecting element and the holding element is used for supporting the forces directed by the external load against the aircraft, and because of this linear contact lower frictional forces occur between these two elements than in a surface contact so that detaching the connection is not made unnecessarily more difficult.

It is also advantageous when the lower supporting surface and the first opposing supporting surface are curved in a circular arc. Because of this circular arc configuration, the separation of connecting element and holding element may be effected by a pivot movement of the external load, which movement is caused by a front locking device being opened and the nose of the external load being ejected downward.

It is particularly advantageous when the center point of the radius of curvature for the first opposing supporting surface is disposed on the upper edge. In this particularly preferred variant, the hook-like connecting element pivots about the upper edge on the upper margin of the recess in the holding element, the contact line between the upper section of the hook-like connecting element and the upper edge defining the pivot axis. Because the lower supporting surface and the first opposing supporting surface have the same radius of curvature, these surfaces slide onto one another during the pivot movement.

As long as a pre-specified pitch angle for the external load is not exceeded, the hook-like connecting element is held fast due to the special geometric configuration of the hook-like connecting element and the holding element in this particularly preferred embodiment of the inventive connecting arrangement. Only when this pitch angle is exceeded does the nose of the hook-like connecting element automatically escape from the first recess of the holding element so that the connecting element then detaches from the holding element. Still, contact is always maintained between the upper supporting surface of the hook-like connecting element and the edge on the upper margin of the recess of the holding element so that the hook-like connecting element can only move downward and to the rear with respect to the holding element. Thus, in this embodiment the tail of the external load can only move to the rear and downward, which ensures that the tail does not collide with the aircraft after the connecting arrangement is detached.

One particularly preferred refinement of the inventive connecting arrangement is distinguished in that the fastening shaft of the hook-like connecting element is provided with lateral projections, each of which has on its bottom another supporting surface, in that the holding element in the area of the recess is embodied for receiving the left or right lateral projection, and in that a lower opposing supporting surface is provided in each area of the lower wall of the recess.

Providing these additional lateral projections and their supporting surfaces and the additional lateral opposing supporting surfaces for the supporting surfaces of the lateral projections reliably enhances the load capacity of the entire connecting arrangement, since now the load forces do not have to be supported by the lower supporting surface of the nose of the hook-like connecting element, but rather are distributed onto the two lateral projections and their lower supporting surfaces and the opposing supporting surfaces associated with them.

In this case it is also advantageous when each additional lower supporting surface and the associated lower opposing supporting surface are curved in a circular arc and when the center point of the radius of curvature for each lower opposing supporting surface is preferably disposed on the upper edge. In this case when there is a pivot movement by the hook-shaped connecting element about the pivot axis formed in the area of the upper edge, all of the lower supporting surfaces and lower opposing supporting surfaces slide onto one another synchronously.

Preferred exemplary embodiments of the invention with additional details and further advantages are described in greater detail and explained in the following referring to the enclosed drawings.

BRIEF DESCRIPTION OF THE DRAWINGS

FIG. 3 is a vertical section through the inventive connecting arrangement during a carrying flight;

FIG. 4 is a vertical section through the inventive connecting arrangement in accordance with FIG. 3, but with the hook-like connecting element pivoted at the moment of detachment; and, FIG. 5 is the vertical section of the inventive connecting arrangement as illustrated in FIGS. 3 and 4, but shortly after detachment.

DEPICTION OF PREFERRED EXEMPLARY EMBODIMENTS

Figure 1:
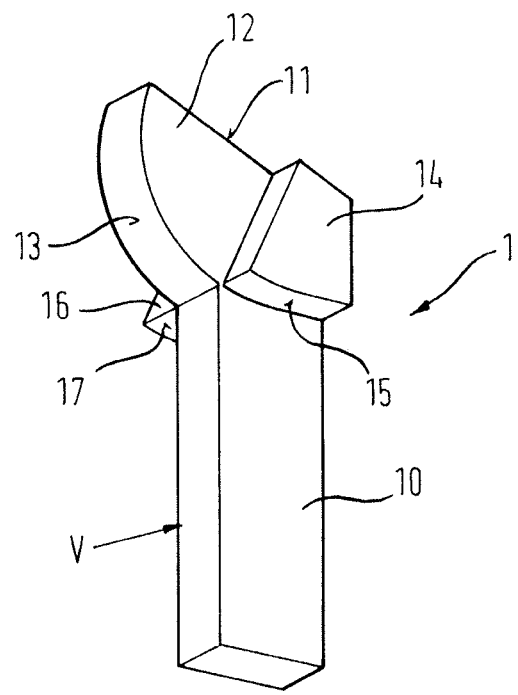
FIG. 1 is a perspective elevation of a hook-like connecting element of an inventive connecting arrangement.

FIG. 1 depicts a hook-like connecting element 1 of an inventive detachable connecting arrangement. The corresponding holding element 2 for the hook-like connecting element 1 is depicted in a perspective elevation in FIG. 2.

The hook-like connecting element 1 has a fastening shaft 10 that in the area of its lower end is connectable or connected with a launchable external load 3 (FIG. 3) that is to be attached to an aircraft. Provided at the upper end of the fastening shaft 10 is a nose 12 that projects to a front, which nose has on its upper side an essentially flat upper supporting surface 11 and on its bottom is curved in a circular arc, the surface curved in a circular arc defining a first lower supporting surface 13 of the hook-like connecting element 1.

Furthermore, provided at the upper end of the fastening shaft 10 are a first lateral projection 14 and a second lateral projection 16, which are disposed on two opposing sides of the fastening shaft 10, to the left and right of the section of the fastening shaft 10 from which the nose 12 projects. The lateral projections 14, 16 thus each extend at a right angle to the direction in which the nose 12 projects. Each of the lateral projections 14, 16 are provided with another lower supporting surface on their bottoms, specifically a second lower supporting surface 15 and a third lower supporting surface 17. The second lower supporting surface 15 and the third lower supporting surface 17 are curved in a circular arc in the same manner as the first lower supporting surface 13 about the same axis of curvature as the lower supporting surface 13.

Figure 2:
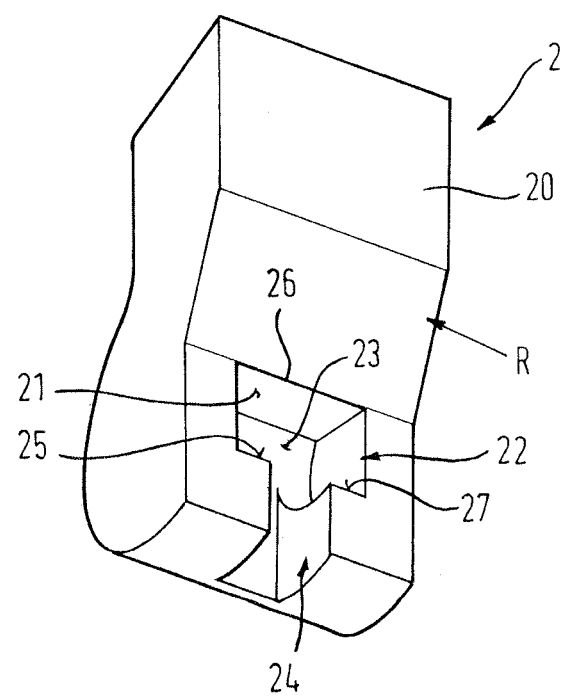
FIG. 2 is a perspective elevation of a holding element in the inventive connecting arrangement.

FIG. 2 depicts the counterpart to the hook-like connecting element 1 shown in FIG. 1, specifically the holding element 2 for the hook-like connecting element 1. The holding element 2 is also provided with a fastening shaft 20, which at its upper end may be attached to the aircraft 4, for instance to a pylon 40 affixed under the fuselage or under a bearing surface of the aircraft 4.

In the area of its lower end the holding element 2 is provided on the back side R with a recess 22 that opens to the back side and that transitions downward, that is to the lower end, into a groove-like recess 24 that opens to the lower end.

The first recess 22 receives the nose 12 of the hook-like connecting element 1 and receives at least part of the lateral projections 14, 16 of the hook-like connecting element 1. The second, groove-like recess 24 receives at least part of a section of the fastening shaft 10 of the hook-like connecting element 1, as may be seen in the longitudinal section in FIG. 3.

In addition, on the recess floor that is oriented towards the front V, the first recess 22 is provided with a first opposing supporting surface 23 against which the lower supporting surface 13 of the nose 12 may be positioned and supported.

In addition, on both sides of the opening of the second recess 24, the recess 22 is provided with additional lower opposing supporting surfaces, specifically a second opposing supporting surface 25 and a third opposing supporting surface 27, that are embodied for positioning and supporting the supporting surfaces 15 and 17 on the bottom of the lateral projections 14, 16 of the hook-like connecting element 1. The opposing supporting surfaces 23, 25, and 27 are embodied curved in the same manner as the associated supporting surfaces 13, 15, and 17 of the hook-like connecting element.

Embodied on the interior of the first recess 22 opposing the opening of the second, groove-like recess 24 is an upper opposing supporting surface 21 that is provided for positioning the upper supporting surface 11 of the hook-like connecting element 1. This upper opposing supporting surface 21 runs upward, in the form of an undercut, from the associated upper opening edge 26 of the first recess 22 on the back R of the holding element 2, as may be seen in FIG. 3, so that the upper opposing supporting surface 21 extends starting from the rear edge 26 in a direction that with the longitudinal direction of the second, groove-like recess forms an angle α of greater than 90°, as may be seen in FIGS. 3 through 5.

In conformance with this, the upper supporting surface 11 of the hook-like connecting element 1 with the longitudinal direction of the fastening shaft 10 also form an angle β, which equals angle α.

In FIGS. 3 and 4 it may furthermore be seen that the radius of curvature R1 for the supporting surfaces 13, 15, and 17 and the radius of curvature R2 for the opposing supporting surfaces 23, 25, and 27 have the same center point, which, when the hook-like connecting element 1 is engaged in the holding element 2, as illustrated in FIGS. 3 and 4, is disposed on the upper rear edge 26 of the first recess 22.

In the position depicted in FIG. 3, the hook-like connecting element 1 and the holding element 2 are engaged in a locked position that is provided for the carrying flight of the aircraft 4 provided with the external load 3. The weight G of the external load 3 that acts of the hook-like connecting element 1, or the mass forces of the external load 3 that act in the direction indicated by the arrow G in FIG. 3 pull the hook-like connecting element 1 downward, the latter being supported via its lower supporting surfaces 13, 15, and 17 on the opposing supporting surfaces 23, 25, 27 of the holding element 2 and thus not being able to come out of the recess 22 in a downward direction. The hook-like connecting element 1 is also effectively prevented from coming out of the recess 22 in a rearward direction by the undercut of the upper opposing supporting surface 21 and the adapted inclination of the upper supporting surface 11.

It is not until the forward (in the direction of flight F) fastening device (not shown) for fastening the external load 3 to the aircraft 4 is opened and the nose of the external load 3 is pitched downward, as symbolized by the arrow P in FIG. 4, that the hook-like connecting element 1 pivots in the same rotational direction as the pitch movement P, the upper supporting surface 11 of the nose 12 of the hook-like connecting element 1 pivoting out of the undercut formed by the upper supporting surface 21. Even the lower supporting surfaces 13, 15, and 17 pivot rearward out of contact with the opposing supporting surfaces 23, 25, 27 associated with them, as depicted in FIG. 4. At this moment the hook-like connecting element 1 is neither retained downward nor to the rear of the holding element 2 and the external load 3 may move away downward and to the rear of the aircraft 4, the nose 12 of the hook-like connecting element 1 initially being guided in the groove-like recess 24, reducing the risk of the external load 3 rotating about its vertical axis, that is, reducing the risk that the external load 3 will experience a yawing movement.

It may also be seen from FIG. 4 that while the external load 3 pivots on the edge 26 the upper supporting surface 11 of the hook-like connecting element 1 is supported on the upper margin of the recess 22 so that the external load 3 is prevented from moving upward, i.e. in the direction of the aircraft 4.

The depicted special geometric configuration of the hook-like connecting element 1 and holding element 2 consequently attain the situation in which the hook-like connecting element 1 is held securely by the holding element 2 until the external load 3 exceeds a pre-specified pitch angle. When this angle is exceeded, the hook-like connecting element 1 automatically detaches from the holding element 2, but the external load 3 is only able to move downward and to the rear. This inventive connecting arrangement has a simple mechanical construction and apart from the hook-like connecting element 1 and the holding element 2 requires no other movable parts so that it is not only not susceptible to faults but is also cost-effective to produce. The function of the detaching mechanism is based solely on the geometrical positioning of the two elements in the connecting arrangements, specifically the hook-like connecting element 1 and the holding element 2, relative to one another. Therefore no additional mechanical elements are needed with the inventive solution. The special shape of the hook-like connecting element 1 and the holding element 2 as depicted in the figures, which shape has been described in the foregoing, ensures secure fixation of the connecting arrangement in all directions as long as the pre-specified detachment angle γ is not attained.

Reference numbers in the claims, description, and drawings merely serve better understanding of the invention and shall not limit the protective scope of the patent.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE LIST

1 Hook-like connecting element
2 Holding element
3 Launchable external load
4 Aircraft
10 Fastening shaft
11 Upper supporting surface
12 Projecting nose
13 First lower supporting surface
14 First lateral projection
15 Second lower supporting surface
16 Second lateral projection
17 Third lower supporting surface
20 Fastening shaft
21 Upper opposing supporting surface
22 First recess
23 Opposing supporting surface
24 Second, groove-like recess
25 Second opposing supporting surface
26 Rear opening edge
27 Third opposing supporting surface
40 Pylon
F Direction of flight
G Weight
P Arrow
R Back side
R1 Radius of curvature
R2 Radius of curvature
V Front

The invention claimed is:

1. A detachable connecting arrangement for fitting a launchable external load to an aircraft, the detachable connecting arrangement comprising:
   a connecting element configured for connection to the external load; and
   a holding element configured for connection to the aircraft and to the connecting element,
   wherein the connecting element includes at least one lower supporting surface and at least one upper supporting surface;
   wherein the holding element includes at least one first opposing supporting surface that is configured to interact with the at least one lower supporting surface of the connecting element, and at least one second, upper opposing supporting surface that is configured to interact with the at least one upper supporting surface of the connecting element,
   wherein the at least one lower supporting surface of the connecting element and the at least one first opposing supporting surface of the holding element are configured to support mass forces of the external load directed away from the aircraft,
   wherein the at least one upper supporting surface of the connecting element and the at least one second, upper opposing supporting surface of the holding element are configured to support mass forces of the external load directed towards the aircraft,
   wherein the connecting element comprises a fastening shaft for connection to the external load at a lower end of the fastening shaft, the fastening shaft having a projecting nose at an upper end,
   wherein the at least one lower supporting surface of the connecting element is arranged on a bottom of the projecting nose of the fastening shaft, the bottom of the projecting nose facing towards the lower end of the fastening shaft,
   wherein the holding element has a first recess that is configured to engage the projecting nose of the fastening shaft,
   wherein the first recess opens towards a back side of the holding element,
   wherein the at least one first opposing supporting surface of the holding element is arranged in an area of a floor of the first recess being oriented towards the back side of the holding element, and
   wherein the at least one lower supporting surface of the connecting element and the at least one first opposing supporting surface of the holding element are curved in a circular arc.

2. The detachable connecting arrangement in accordance with claim 1,
   wherein the first recess of the holding element transitions into a second recess being configured to receive the fastening shaft of the connecting element,
   wherein the second recess extends to a lower end of the holding element and opens to both the lower end and the back side of the holding element.

3. The detachable connecting arrangement in accordance with claim 1, wherein the at least one upper supporting surface of the connecting element is arranged on an upper section of the connecting element and the at least one second, upper opposing supporting surface of the holding element is arranged on an upper margin of the first recess for the holding element and extends at least to an upper edge of the first recess.

4. The detachable connecting arrangement in accordance with claim 1, wherein a center point of the radius of curvature for the at least one first opposing supporting surface of the holding element is disposed on the upper edge of the first recess.

5. The detachable connecting arrangement in accordance with claim 1,
   wherein the fastening shaft of the connecting element includes left and right lateral projections, each of which has on its bottom another lower supporting surface,
   wherein the left and right-lateral projections project from the fastening shaft at opposite sides thereof and extend transverse to a direction in which the nose protrudes from the fastening shaft,
   wherein the holding element, in corresponding areas of the first recess, is configured to receive the left and right lateral projections, and
   wherein lower opposing supporting surfaces of a lower wall of the first recess are arranged in each of the areas corresponding to the left and right lateral projections.

6. The detachable connecting arrangement in accordance with claim 5, wherein each of the lower supporting surfaces of the left and right lateral projections and each of the associated lower opposing supporting surfaces of the first recess is curved in a circular arc.

7. The detachable connecting arrangement in accordance with claim 6, wherein a center point of the radius of curvature for each of the lower opposing supporting surfaces of the first recess and for each of the other lower support surfaces of the left and right lateral projections is disposed on an upper edge of the first recess.

8. A detachable connecting arrangement for fitting a launchable external load to an aircraft, the detachable connecting arrangement comprising:

a connecting element configured for connection to the external load; and a holding element configured for connection to the aircraft and to the connecting element, wherein the connecting element includes at least one lower supporting surface and at least one upper supporting surface, wherein the holding element includes at least one first opposing supporting surface that is configured to interact with the at least one lower supporting surface of the connecting element, and at least one second, upper opposing supporting surface that is configured to interact with the at least one upper support surface of the connecting element, wherein the at least one lower supporting surface of the connecting element and the at least one first opposing supporting surface of the holding element are configured to support mass forces of the external load directed away from the aircraft, wherein the at least one upper supporting surface of the connecting element and the at least one second, upper opposing supporting surface of the holding element are configured to support mass forces of the external load directed towards the aircraft, wherein the connecting element comprises a fastening shaft for connection to the external load at a lower end of the fastening shaft, the fastening shaft having a projecting nose at an upper end, wherein the at least one lower supporting surface of the connecting element is arranged on a bottom of the projecting nose of the fastening shaft, the bottom of the projecting nose facing towards the lower end of the fastening shaft, wherein the holding element has a first recess that is configured to engage the projecting nose of the fastening shaft, wherein the first recess opens towards a back side of the holding element, wherein the at least one first opposing supporting surface of the holding element is arranged in an area of a floor of the first recess being oriented towards the back side of the holding element, wherein the fastening shaft of the connecting element includes left and right-lateral projections, each of which has on its bottom another lower supporting surface, wherein the left and right-lateral projections project from the fastening shaft at opposite sides thereof and extent transverse to a direction in which the nose protrudes from the fastening shaft, wherein the holding element, in corresponding areas of the first recess, is configured to receive the left and right lateral projections, and wherein lower opposing supporting surfaces of a lower wall of the first recess are arranged in each of the areas corresponding to the left and right lateral projections.

9. The detachable connecting arrangement in accordance with claim 8, wherein each of the lower supporting surfaces of the left and right lateral projections and each of the associated lower opposing supporting surfaces of the first recess are curved in a circular arc.

10. The detachable connecting arrangement in accordance with claim 8, wherein a center point of the radius of curvature for each of the lower opposing supporting surfaces of the first recess and for each of the other lower supporting surfaces of the left and right lateral projections is disposed on an upper edge of the first recess.

11. The detachable connecting arrangement in accordance with claim 8, wherein the first recess of the holding element transitions into a second recess being configured to receive the fastening shaft of the connecting element, and wherein the second recess extends to a lower end of the holding element and opens to both the lower end and the back side of the holding element.

12. The detachable connecting arrangement in accordance with claim 8, wherein the at least one upper supporting surface of the connecting element is arranged on an upper section of the connecting element and the at least one second, upper opposing supporting surface of the holding element is arranged on an upper margin of the first recess for the holding element and extends at least to an upper edge of the first recess.

* * * * *